(12) United States Patent
Kim

(10) Patent No.: US 8,610,824 B2
(45) Date of Patent: Dec. 17, 2013

(54) CAMERA MODULE FOR IMPROVING DROP RELIABILITY AND INHIBITING FINE DUST INTRUSION

(75) Inventor: Min Soo Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 88 days.

(21) Appl. No.: 13/132,540

(22) PCT Filed: Aug. 24, 2009

(86) PCT No.: PCT/KR2009/004707
§ 371 (c)(1),
(2), (4) Date: Aug. 26, 2011

(87) PCT Pub. No.: WO2010/064775
PCT Pub. Date: Jun. 10, 2010

(65) Prior Publication Data
US 2012/0002087 A1    Jan. 5, 2012

(30) Foreign Application Priority Data

Dec. 2, 2008   (KR) .................. 10-2008-0120999

(51) Int. Cl.
*H04N 5/225* (2006.01)
(52) U.S. Cl.
USPC .......................... 348/374; 348/294
(58) Field of Classification Search
USPC ............... 348/294, 302, 308, 374; 250/208.1
See application file for complete search history.

(56) References Cited

U.S. PATENT DOCUMENTS

| | | | | |
|---|---|---|---|---|
| 7,429,783 B2* | 9/2008 | Cheng | ........................... | 257/678 |
| 7,663,083 B2* | 2/2010 | Kwon et al. | ................ | 250/208.1 |
| 7,901,972 B2* | 3/2011 | Go | ................................... | 438/64 |
| 2007/0158538 A1* | 7/2007 | Wang | ............................ | 250/239 |
| 2007/0275505 A1 | 11/2007 | Wolterink et al. | | |
| 2008/0252775 A1 | 10/2008 | Ryu et al. | | |
| 2008/0278621 A1 | 11/2008 | Cho et al. | | |
| 2009/0243051 A1* | 10/2009 | Vanam et al. | ................. | 257/659 |

FOREIGN PATENT DOCUMENTS

| | | |
|---|---|---|
| JP | 11-112854 A | 4/1999 |
| JP | 2001-245186 A | 9/2001 |
| JP | 2004-172790 A | 6/2004 |
| JP | 2004-297282 A | 10/2004 |
| JP | 2005-327842 A | 11/2005 |
| JP | 2005-539276 A | 12/2005 |
| JP | 2007-151111 A | 6/2007 |
| KR | 10-0806688 B1 | 2/2008 |

OTHER PUBLICATIONS

Office Action dated Feb. 27, 2013 in Chinese Application No. 200980148397.6, filed Aug. 24, 2009.
Official Communication dated Nov. 13, 2012 in European Application No. 09830513.9, filed Aug. 24, 2009.
Office Action dated Sep. 17, 2013 in Japanese Application No. 2011-539439, filed Aug. 24, 2009.

* cited by examiner

*Primary Examiner* — Gevell Selby
(74) *Attorney, Agent, or Firm* — Saliwanchik, Lloyd & Eisenschenk

(57) ABSTRACT

Disclosed is a camera module including a WLO (wafer level optic) which is manufactured as a wafer optical device; an image sensor which converts an optical signal from the WLO into an electric signal; a holder which functions as a housing of the camera module; and a substrate which has a circuit pattern and transfers the converted electrical signal to a main body, wherein a stumbling sill is formed at an outer edge portion of the substrate so that a lower end of the holder is mounted on the stumbling sill.

17 Claims, 2 Drawing Sheets

CAMERA MODULE FOR IMPROVING DROP RELIABILITY AND INHIBITING FINE DUST INTRUSION

CROSS-REFERENCE TO RELATED APPLICATIONS

This application is the U.S. national stage application of International Patent Application No. PCT/KR2009/004707, filed Aug. 24, 2009, which claims priority to Korean Application No. 10-2008-0120999, filed Dec. 2, 2008, the disclosures of each of which are incorporated herein by reference in their entirety.

TECHNICAL FIELD

The present invention relates to a camera module.

BACKGROUND ART

Various wafer devices are manufactured by a wafer process, and for example, one of them is a WLO (wafer level optic) functioning as a lens optical device. The WLO is formed as a lens optical device on a wafer level without a focusing process after manufacturing thereof.

FIGS. 1 and 2 are cross-sectional views of a camera module using a WLO as an optical device, wherein FIG. 1 shows a camera module manufactured by a COB (Chip on Board) method in which an image sensor is wire-bonded, and FIG. 2 shows a camera module manufactured by a CSP (Chip Scale Package) method.

Referring to FIG. 1, an image sensor 20 is bonded to a substrate 10 having a circuit pattern by an adhesive such as epoxy, and the substrate 10 is electrically connected with a pad of the image sensor 20 through a wire 11 I order to receive and transmit a signal, and a WLO 30 is disposed on the image sensor.

Meanwhile, referring to FIG. 2, in case an image sensor package 21 of a WLCSP is formed using a wafer, the WLO 30 is disposed on the manufactured image sensor package 21.

As shown in FIGS. 1 and 2, after the WLO is disposed on the wire-bonded image sensor or the image sensor package, a holder 40 is mounted as a housing, thereby finishing the manufacturing process.

However, as shown in FIGS. 1 and 2, since the holder 40 is bonded to an outside of the image sensor or the substrate, there is a problem that drop reliability is deteriorated due to a contacting surface area of the holder.

Particularly, in case a metallic holder is used to alleviate a problem that a noise is generated by electrical disturbance from an outside, the drop reliability is deteriorated due to an amount of conductive epoxy and a contacting surface area. Further, fine dust may be introduced due to a structure of a contacting surface

DISCLOSURE

Technical Problem

An object of the present invention is to provide a camera module which has a coupling structure between a substrate and a holder for improving drop reliability and preventing introduction of fine dust.

Technical Solution

To achieve the object of the present invention, the present invention provides a camera module including a WLO (wafer level optic) which is manufactured as a wafer optical device; an image sensor which converts an optical signal from the WLO into an electric signal; a holder which functions as a housing of the camera module; and a substrate which has a circuit pattern and transfers the converted electrical signal to a main body, wherein a stumbling sill is formed at an outer edge portion of the substrate so that a lower end of the holder is mounted on the stumbling sill.

Preferably, the substrate is formed with an opening corresponding to an imaging region of the image sensor, and connected with the pad of the image sensor so as to transfer the electric signal to the main body.

Preferably, a pocket portion is formed at a lower side of the substrate so as to receive the image sensor.

Preferably, the camera module further includes a protruded end which is protruded around the opening of the substrate so as to support the WLO and thus to prevent the WLO from being shaken left and right.

Advantageous Effects

According to the present invention, it is possible to guide the holder and also to enhance the drop reliability since the holder is installed at the stumbling sill formed at the outer edge portion of the substrate. Furthermore, it is possible to prevent the generation of the noise due to the electrical disturbance and also to prevent the introduction of the external dust since the outer surface of the stumbling sill is ground.

DESCRIPTION OF DRAWINGS

The above and other objects, features and advantages of the present invention will become apparent from the following description of preferred embodiments given in conjunction with the accompanying drawings, in which.

BEST MODE

Figure 1:
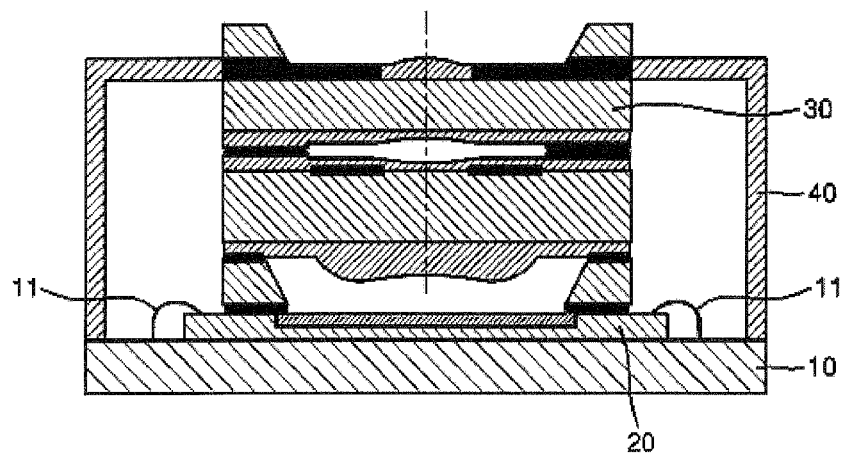
FIG. 1 is a view of a camera module manufactured by a COB (Chip on Board) method in which an image sensor is wire-bonded.
Figure 2:
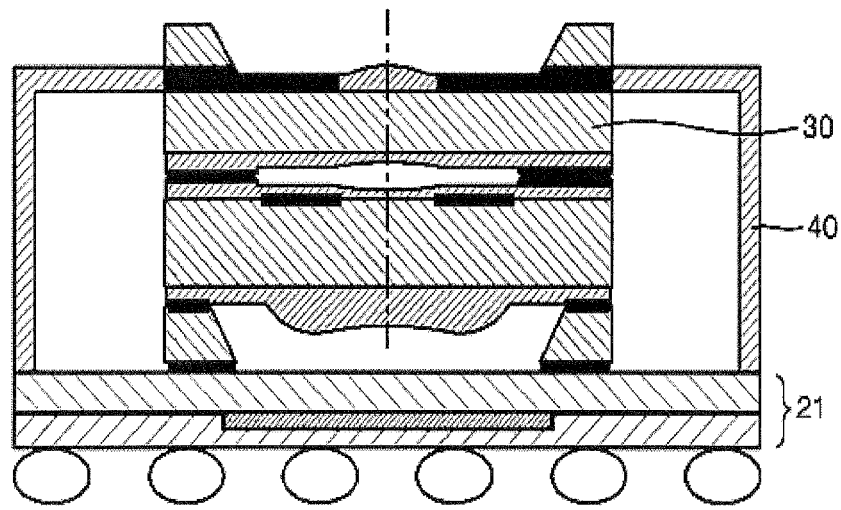
FIG. 2 is a view of a camera module manufactured by a CSP (Chip Scale Package) method.

Hereinafter, the embodiments of the present invention will be described in detail with reference to accompanying drawings. Herein, the same reference numerals are given to the same or corresponding parts, although they are illustrated in different drawings.

In the present invention, when a WLO (Wafer Level Optic) which is formed as an optical device of a lens on a wafer level without a focusing process is applied to a camera module, an outside portion of a substrate, on which a holder is mounted, is formed into a stumbling sill structure.

The holder is mounted on the stumbling sill of the substrate so as to stabilize a contacting surface, thereby improving drop reliability. Further, since the holder covers the substrate, it is possible to prevent introduction of dust.

Hereinafter, a shape of the substrate in a camera module manufactured by a COB method will be described with reference to FIG. 3, and also a shape of the substrate in a camera module manufactured by a COF (Chip on Film) method will be described with reference to FIG. 4. Furthermore, it is obvious that the present invention can be applied to other cameral modules manufactured by other methods, if the substrate and the holder are coupled with each other.

Figure 3:
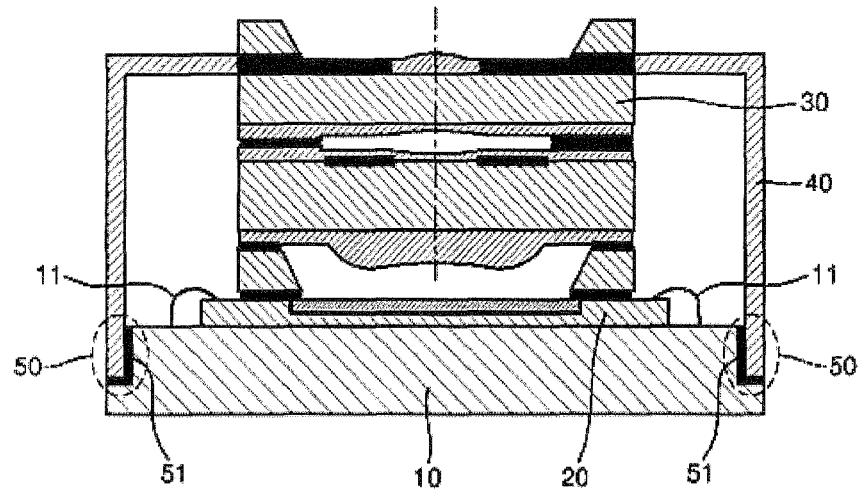
FIG. 3 is a cross-sectional view of a camera module manufactured by a COB method according to an embodiment of the present invention.

FIG. 3 is a cross-sectional view of a camera module manufactured by a COB method according to an embodiment of the present invention.

A camera module manufactured by a COB method includes an image sensor, a substrate, a WLO and a holder. The image sensor is disposed on and wire-bonded to the substrate so that a signal of the image sensor is transferred to a main body through a via hole.

The image sensor 20 is disposed at a lower side of the WLO 30 functioning as a lens optical device. The image sensor 20 functions to convert an optical image received through the WLO 30 into an electric signal.

A circuit pattern is formed on the substrate 10, and the substrate 10 and the image sensor 20 are connected with each other by wire-bonding. The signal of the image sensor is transferred to a main substrate of the main body through a wire bonded to the substrate and the via hole.

The outer edge portion of the substrate 10 is formed into the 'L' shaped stumbling sill 50. In order for the outer edge portion of the substrate 10 to be formed into the stumbling sill having a stepped structure, the substrate is preferably formed of a material which can easily form the stepped structure.

For example, since an existing substrate is formed of a glass epoxy material such as FR4, it is difficult to form the stumbling sill having the stepped structure. Therefore, in the present invention, the substrate is formed of a ceramic material in order to easily form the stumbling sill 50 having the stepped structure.

Meanwhile, the wire 11 is boned between the substrate 10 and the image sensor 20. While the WLO is located on the image sensor, the holder 40 formed of a metallic material is disposed on the substrate 10, thereby functioning as the housing of the camera module.

At this time, the holder 40 is located on the stumbling sill 50 formed at the outer edge portion of the substrate.

By a structure that the holder 40 is disposed on the stumbling sill 50 of the substrate 10, the holder 40 is contacted with a side surface of the substrate as well as a bottom surface thereof Thus, drop reliability can be improved and also a guide hole is not needed when mounting the holder.

Further, a whole surface of the stumbling sill is ground, that is, the side surface of the substrate as well as the bottom surface thereof are ground, such that a surface area between the holder 40 and the substrate 10 is increased, thereby preventing generation of a noise due to electrical disturbance from an outside. Since the holder is formed of a metallic material, electrostatic charges transferred from the outside to the holder are ground through a grinding portion 51, and thus it is possible to reduce errors generated by the electrical disturbance. Further, the holder is placed on the stumbling sill of the substrate so that the substrate is wholly covered by the holder, thereby preventing introduction of dust.

Figure 4:
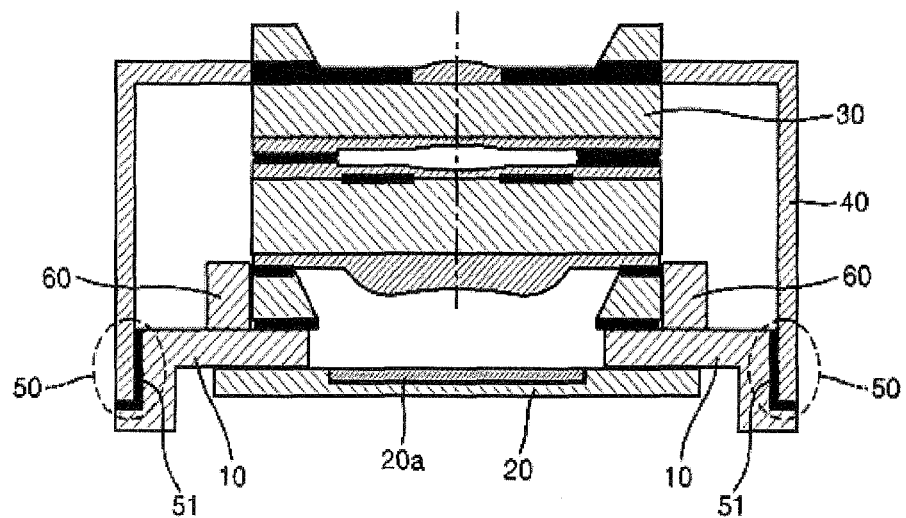
FIG. 4 is a cross-sectional view of a camera module manufactured by a COF (Chip on Film) method according to an embodiment of the present invention.

FIG. 4 is a cross-sectional view of a camera module manufactured by a COF (Chip on Film) method according to an embodiment of the present invention.

A camera module manufacture by a COF method, including an image sensor, a substrate, a WLO and a holder, is characterized in that a signal from the image sensor is transferred to a main body through a film type substrate.

In the present invention, a ceramic substrate is used instead of the film type substrate. An opening is formed at a center portion of the substrate 10 so as to be corresponding to an imaging region 20a.

A connection pad is formed around a lower surface of the opening so as to be connected with an image sensor pad formed at an upper surface of the image sensor, thereby transferring an electrical signal of the image sensor to the main body. Further, a pocket portion 12 for receiving the image sensor 20 is formed at a lower side of the substrate 10. The pocket portion 12 is defined by a bent portion of the substrate which is bent downward so as to receive the image sensor 20. However, the pocket portion 12 may be formed into various shapes.

As described above, the substrate 10 further includes the pocket portion 12 having the bent portion. Herein, the outer edge portion of the substrate 10 is formed with the stumbling sill 50.

This structure functions as a guiding member so that the holder 40 can be stably mounted on the stumbling sill 50. Further, it functions to increase coupling force between the substrate 10 and the holder 40, thereby enhancing the drop reliability and also preventing the introduction of fine dust. Further, the outer portion of the stumbling sill 50 is grounded so as to prevent the generation of the noise due to the electrical disturbance.

Meanwhile, the substrate 10 further includes a protruded end 60 which is protruded upward. As described above, the substrate 10 functions to transfer the signal of the image sensor 20 to the main body through the connection between pads. Further, since the substrate 10 has the pocket portion 12 having the bent portion which is bent downward, it is possible to protect the image sensor 20 and also to support the holder 40. Furthermore, the substrate 10 further includes the protruded end 60 which is protruded upward so as to guide the WLO 30.

Since the WLO 30 is located inside the protruded end 60 of the substrate 10, it is possible to stably mount the WLO 30 without a high-priced equipment, thereby enhancing reliability of the product.

The protruded end 60 may be provided in plural and also formed integrally around the opening of the substrate 10 in the form of a castle.

INDUSTRIAL APPLICABILITY

According to the present invention, since the holder is installed at the stumbling sill formed at the outer edge portion of the substrate, it is possible to guide the holder and also to enhance the drop reliability. Furthermore, since the outer surface of the stumbling sill is grounded, it is possible to prevent the generation of the noise due to the electrical disturbance and also to prevent the introduction of the external dust. While the present invention has been described with respect to the specific embodiments, it will be apparent to those skilled in the art that various changes and modifications may be made without departing from the spirit and scope of the invention as defined in the following claims.

The invention claimed is:

1. A camera module, comprising:
   a WLO (wafer level optic) which is manufactured as a wafer optical device;
   an image sensor which converts an optical signal from the WLO into an electric signal;
   a holder which functions as a housing of the camera module; and
   a substrate which has a circuit pattern and transfers the converted electrical signal to a main body,
   wherein a stumbling sill is formed at an outer edge portion of the substrate so that a lower end of the holder is mounted on the stumbling sill;

wherein the image sensor and the substrate are directly connected with each other by a pad; and wherein the substrate is formed with an opening corresponding to an imaging region of the image sensor and is connected with the pad of the image sensor so as to transfer the electric signal to the main body.

2. The camera module according to claim 1, wherein the image sensor and the substrate are connected with each other by wire-bonding.

3. The camera module according to claim 1, wherein a pocket portion is formed at a lower side of the substrate so as to receive the image sensor, and the stumbling sill is formed at the outer edge portion of the substrate.

4. The camera module according to claim 1, further comprising a protruded end which is protruded around the opening of the substrate so as to support the WLO and thus to inhibit the WLO from being shaken left and right.

5. The camera module according to claim 4, wherein the protruded end is provided in plural or formed integrally around the opening of the substrate.

6. The camera module according to claim 1, wherein the substrate is formed of a ceramic material.

7. The camera module according to claim 1, wherein an outer surface of the stumbling sill is ground.

8. The camera module according to claim 1, wherein the holder is formed of a metallic material.

9. The camera module according to claim 3, further comprising a protruded end which is protruded around the opening of the substrate so as to support the WLO and thus to prevent the WLO from being shaken left and right.

10. The camera module according to claim 8, wherein the holder is connected to ground of the substrate.

11. The camera module according to claim 1, wherein the stumbling sill includes a stepped structure formed at the outer edge portion of an upper surface of the substrate.

12. A camera module, comprising: a WLO (wafer level optic) which is manufactured as a wafer optical device; an image sensor which converts an optical signal from the WLO into an electric signal; a holder which functions as a housing of the camera module; and a substrate which has a circuit pattern, wherein a stumbling sill is formed at an outer edge portion of the substrate so that a lower end of the holder is mounted on the stumbling sill and the outer edge portion of the substrate is wholly covered by a bottom surface of the holder; wherein the image sensor and the substrate are directly connected with each other by a pad; and wherein the substrate is formed with an opening corresponding to an imaging region of the image sensor and is connected with the pad of the image sensor so as to transfer the electric signal to the main body.

13. The camera module according to claim 12, wherein a pocket portion is formed at a lower side of the substrate so as to receive the image sensor, and the stumbling sill is formed at the outer edge portion of the substrate.

14. The camera module according to claim 12, further comprising a protruded end which is protruded around the opening of the substrate so as to support the WLO and thus to inhibit the WLO from being shaken left and right.

15. The camera module according to claim 14, wherein the protruded end is provided in plurality or formed integrally around the opening of the substrate.

16. The camera module according to claim 12, wherein the holder is connected to ground of the substrate.

17. The camera module according to claim 12, wherein the stumbling sill includes a stepped structure formed at the outer edge portion of an upper surface of the substrate.

\* \* \* \* \*